Figure 6:
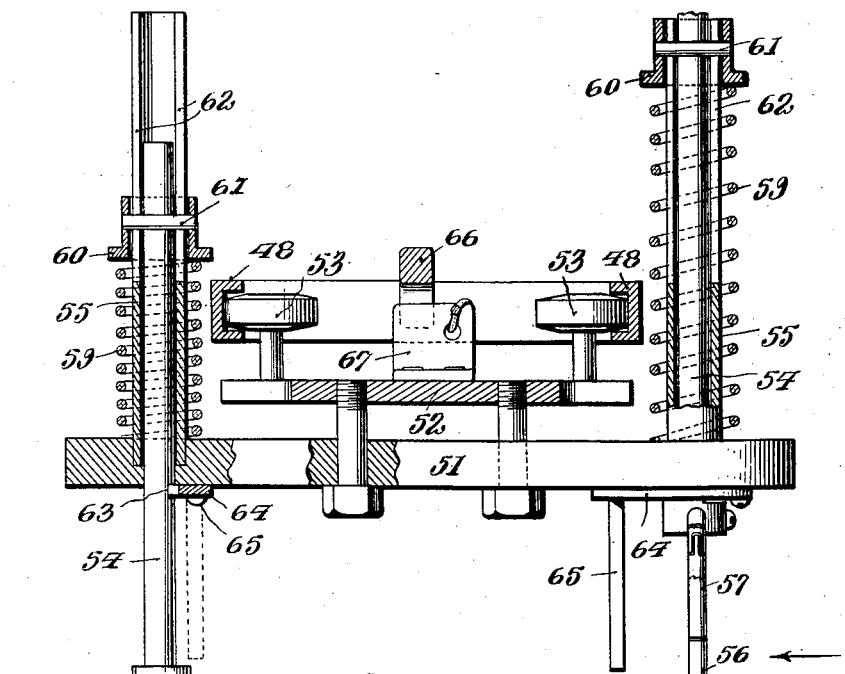

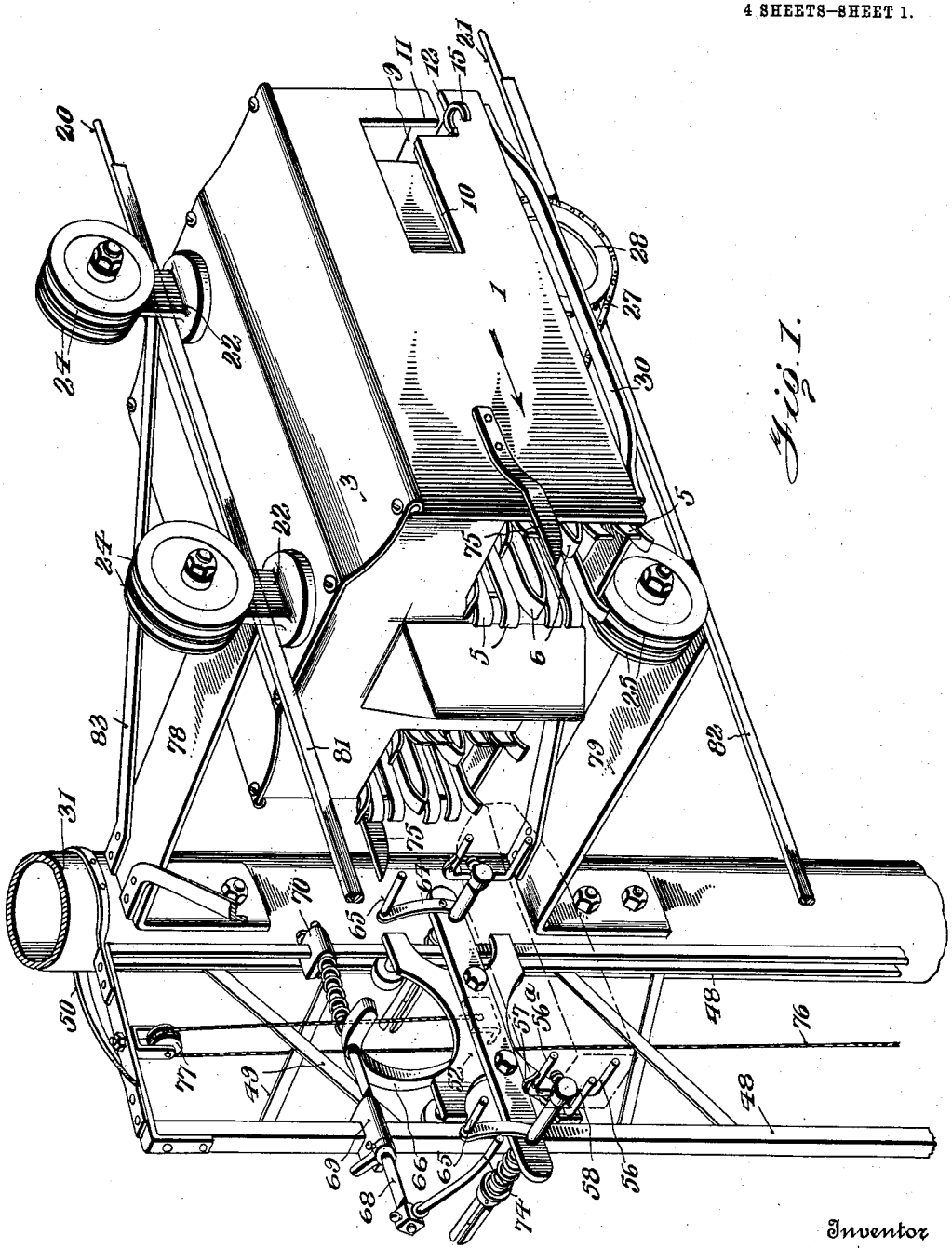
R. G. STARKWEATHER.
MAIL AND PARCEL COLLECTION AND DELIVERY SYSTEM.
APPLICATION FILED AUG. 10, 1911.
1,024,706. Patented Apr. 30, 1912.
4 SHEETS—SHEET 1.
Fig. I.
Witnesses
Inventor
Rufus G. Starkweather
By
Attorney R. G. STARKWEATHER.
MAIL AND PARCEL COLLECTION AND DELIVERY SYSTEM.
APPLICATION FILED AUG. 10, 1911.
1,024,706.
Patented Apr. 30, 1912.
4 SHEETS—SHEET 2.
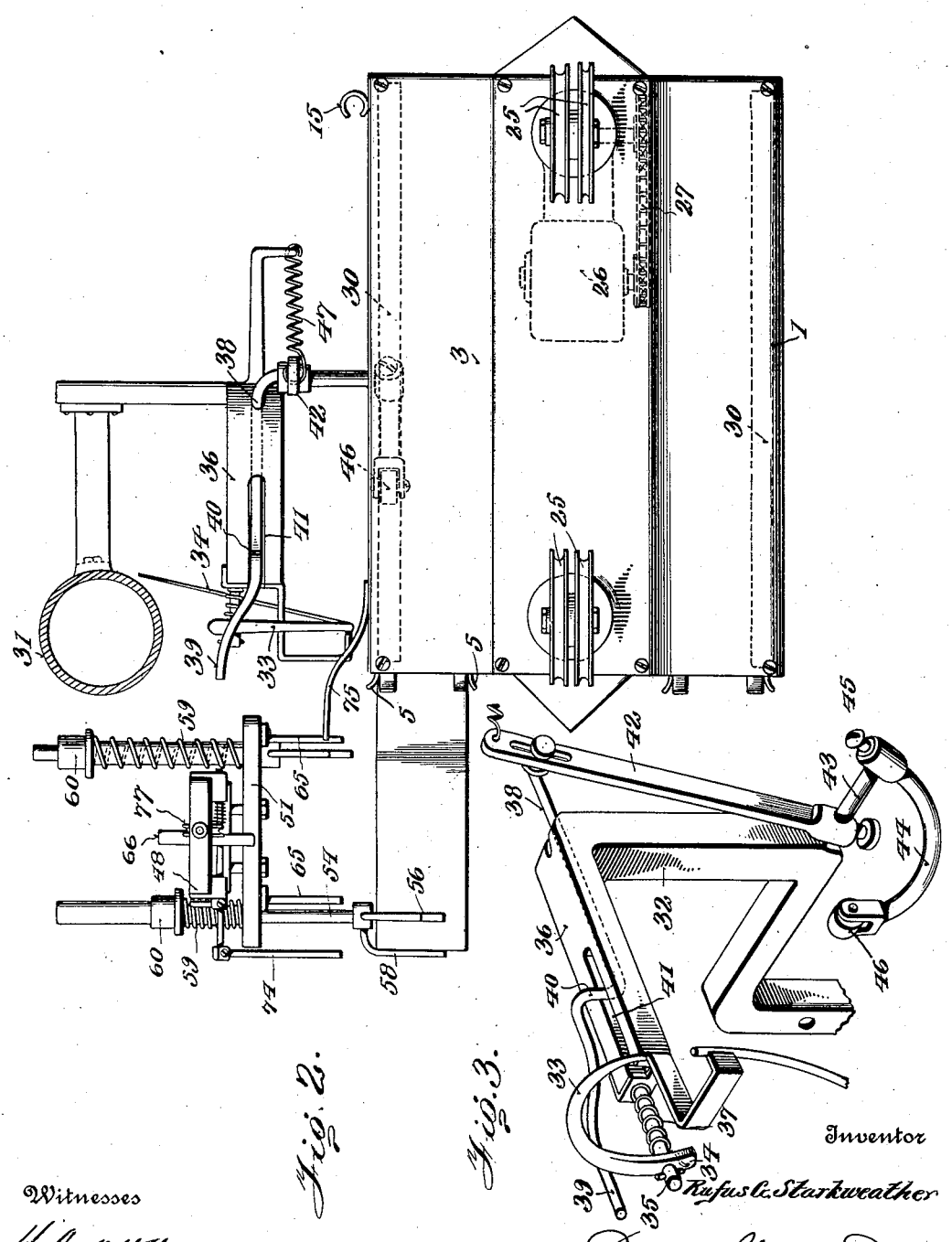

R. G. STARKWEATHER.
MAIL AND PARCEL COLLECTION AND DELIVERY SYSTEM.
APPLICATION FILED AUG. 10, 1911.
1,024,706.
Patented Apr. 30, 1912.
4 SHEETS—SHEET 3.
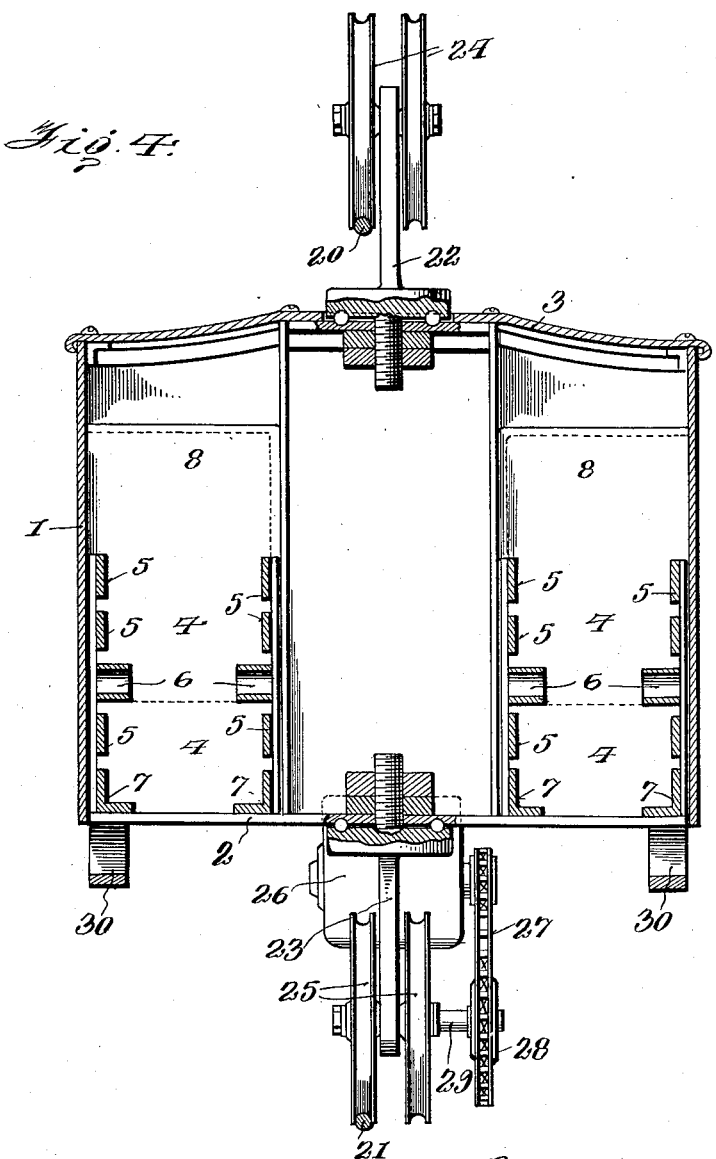
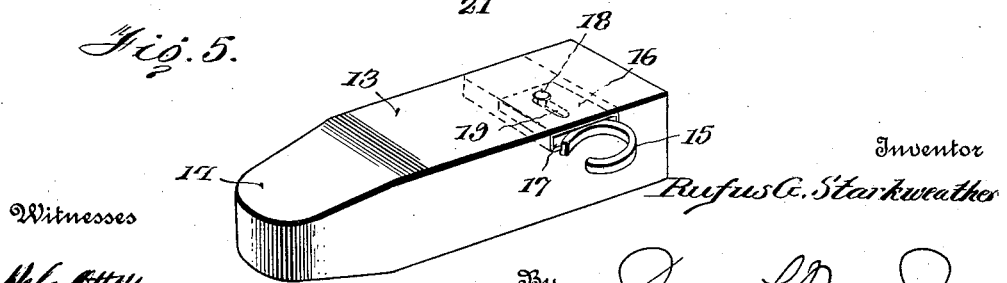
Witnesses
Inventor
Rufus G. Starkweather
By
Attorney R. G. STARKWEATHER.
MAIL AND PARCEL COLLECTION AND DELIVERY SYSTEM.
APPLICATION FILED AUG. 10, 1911.

1,024,706.

Patented Apr. 30, 1912.

4 SHEETS—SHEET 4.

Witnesses

Inventor
Rufus G. Starkweather

By
Attorney

UNITED STATES PATENT OFFICE.

RUFUS G. STARKWEATHER, OF JORDANVILLE, NEW YORK, ASSIGNOR OF ONE-SIXTH TO JENNIE STARKWEATHER, OF JORDANVILLE, NEW YORK.

MAIL AND PARCEL COLLECTION AND DELIVERY SYSTEM.

1,024,706.      Specification of Letters Patent.      Patented Apr. 30, 1912.

Application filed August 10, 1911. Serial No. 643,430.

*To all whom it may concern:*

Be it known that I, RUFUS G. STARKWEATHER, a citizen of the United States, residing at Jordanville, in the county of Herkimer and State of New York, have invented new and useful Improvements in Mail and Parcel Collection and Delivery Systems, of which the following is a specification.

My present invention relates to improvements in systems for the collection and distribution of mail, parcels, and the like, and more particularly to systems of the class adapted for use in rural districts, and the primary object of the invention is to provide an improved system of this kind whereby the expense of installing the system is reduced or minimized, the operation of the system is facilitated, and certainty in the proper collection and distribution of the matter to be handled is insured.

Subsidiary objects of the invention are to provide a car or carrier of improved construction having a novel arrangement of compartments or magazines for the reception and delivery of the mail receptacles, parcels, or other packages, to provide a novel and improved device for holding the receptacle or parcel in a manner to be taken up or received by the carrier, such device having means operated automatically by the car for resetting it and restoring it to a condition where it will not interfere with the motion or operation of the car or carrier, to provide a novel and improved pick-up device which is automatically set by the car in position to remove the appropriate receptacle or parcel therefrom, and to provide a switch for the track whereby the car or carrier may return to its starting point, or traverse branches in the system.

To these and other ends, the invention consists in certain improvements, and combinations and arrangements of parts, all as will be hereinafter more fully described, the novel features being pointed out particularly in the claims at the end of the specification.

Figure 7:
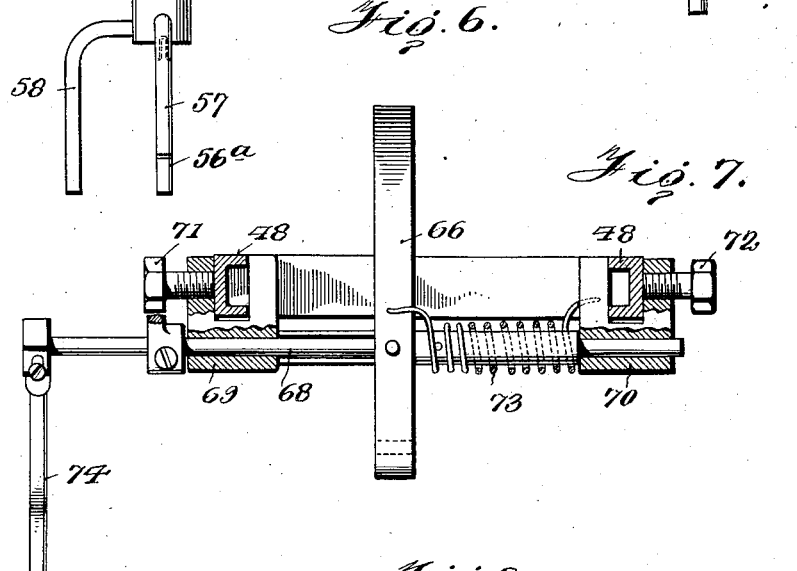
Figure 8:
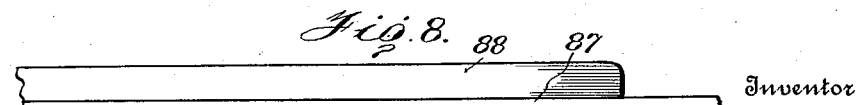

In the accompanying drawing:—Figure 1 is a perspective view of a portion of a collecting and distributing system constructed in accordance with one embodiment of my invention, the car or carrier occupying a position where it is about to take up or receive a receptacle or parcel from one of the stations; Fig. 2 is a top plan view of the car or carrier together with the devices at a station for delivering one receptacle or parcel from the car or carrier and delivering another receptacle or parcel to the car or carrier; Fig. 3 is a perspective view of the pick-up device for removing a receptacle or parcel from the car; Fig. 4 represents a transverse section through the car showing the arrangement of compartments or magazines therein for receiving the receptacles or parcels; Fig. 5 is a perspective view of one form of receptacle adapted for use in connection with the present system; Fig. 6 is a detail view partly in section of the device for positioning a receptacle to be taken up by the car or carrier, one of the receptacle-holding members being shown in retracted position while the other is shown in extended position; Fig. 7 is a detail view partly in section of the catch for holding the receptacle-positioning device in operative position until released automatically by the car; Fig. 8 is a detail view of the switch for automatically returning the car or carrier to the main track from a loop or branch track.

Similar parts are designated by the same reference characters in the several views.

The system according to the present invention comprises generally a car or carrier, a track which is suitably arranged in the area or district to be served and on which the car or carrier travels, and stations for the different patrons or subscribers to the system, these stations being located at appropriate intervals and each embodying devices for automatically removing the appropriate receptacle or parcel from the car or carrier and for delivering a receptacle or parcel to the car or carrier as the latter passes the respective station.

It will be understood that many modifications and changes may be made in the system in carrying the same into practical use. In the present instance, I have shown one embodiment of a system involving the principles of my invention.

In the present instance, the car or carrier consists of a casing or housing 1 having a bottom 2 and a roof 3. The car is provided at the front with a suitable number of compartments 4 to receive the receptacles or parcels from the different stations as the car traverses the system. These receptacle-receiving compartments are preferably arranged at opposite sides of the car in order that such compartments may receive receptacles from stations at either side of the track and, of course, the compartments are open at the front of the car to enable them to receive the receptacles. In the present instance, each compartment is provided with side members or strips 5 to control the movement of the receptacle in a lateral direction and the receptacles in superposed compartments are separated by doubled strips 6 which extend horizontally between the compartments. The forward ends of the several strips are preferably curved or deflected to provide flared openings to insure the reception of the receptacles by the compartments in the car. In the lowermost receiving compartments, angle members 7 may be used which serve the dual function of supporting the receptacles and of limiting their lateral movement.

The rear portion of the car is provided at opposite sides with compartments 8, a pair of these compartments being shown in the present instance and each is adapted to be loaded before the car begins its trip with a number of receptacles to be delivered at the various stations. The rear end of each of the delivering compartments 8 is provided at the bottom of the car with a discharge opening 9 which is slightly larger than the transverse dimensions of the receptacle in order that one of these receptacles at a time may be delivered rearwardly from the car. In the present instance these delivering compartments are so arranged that when charged the receptacles are superposed or piled one above the other and as the lowermost receptacle in the compartment is delivered from the car, the receptacle immediately above it will drop into a position to be delivered at the next station. Each side wall of the car may have an opening 10 leading into the respective compartment 8 whereby such compartment may be loaded with the receptacles. Moreover, the side wall of the car has a slot embodying a vertical portion 11 and a horizontal rearwardly extending portion 12 to accommodate the device on the receptacle which is to be engaged by the pick-up device at the station.

Receptacles of different kinds may be used in connection with the present system. In Fig. 5, I have shown one form of receptacle which is suitable, it comprising a body 13 the forward end 14 of which is preferably tapered as shown to facilitate its entrance into the receiving compartment of the car and this receptacle is provided with a hook 15 whereby the receptacle is removed from the car at the proper station. This hook is used only when the receptacle is to be delivered from the car to the station and when the receptacle is to be taken up by the car from the station, this hook in order to economize space is preferably moved into inoperative position. In the present instance, the hook has a shank 16 which is slidable in a transverse groove or recess 17 formed in the top of the receptacle so that the hook may be withdrawn so as to project beyond one side of the receptacle and may be restored to a position where it is substantially concealed. A pin 18 operating in a slot 19 in the shank of the hook serves to limit the movement of the hook and prevent detachment or loss thereof.

The car according to the present embodiment of my invention is adapted to travel upon two tracks 20 and 21 placed one above another and supported from posts by suitable brackets, wire of appropriate size being suitable for use as tracks. For this purpose, the car is provided at the top and bottom with wheels adapted to travel upon the tracks. In the present instance, the car is provided with two pairs of brackets 22 and 23, the brackets 22 being arranged at the top of the car and provided each with a pair of grooved wheels 24 while the brackets 23 at the bottom of the car are provided each with a pair of grooved wheels 25. These supporting wheels are arranged in pairs in order that the car may be so placed upon the track at the starting point as to follow different desired courses, that is to say, by placing the car in different ways upon the track at the starting point, it may follow either a straight course and then return to the starting point, or, it may be switched from the main line to one or more branch tracks. To enable the wheels to follow switches or curves in the track, the bracket for each pair of wheels is preferably swiveled on a vertical axis as shown clearly in Fig. 4 of the drawing. Any suitable means may be provided for propelling the car along the track. Preferably, the car is propelled by an electric motor carried by the car, the motor receiving its power from the respective tracks serving as electrical conductors. The motor 26 shown conventionally in Fig. 4 is connected to the swiveled bracket 23 so as to turn therewith and thereby maintain a proper operative relation to the wheels 25 which serve for propelling purposes, and any suitable means may be provided for transmitting motion from the motor shaft to these wheels, a sprocket chain 27 being shown in the present instance which coöperates with a sprocket wheel 28, the latter being fixed to the shaft 29 to which the propelling wheels 25 are fixed. The electrical connections for the motor may be of any well known kind and it is unnecessary to describe them. The bottom of the car is provided at each side thereof with a cam rail 30 whereby the pick-up device for each station will be automatically set in condition to remove the appropriate receptacle from the car, one of these rails being provided at each side of the car in order that such operation will be effected irrespective of whether the station is at one or the other side of the track.

Each station comprises a device for automatically picking up and removing the appropriate receptacle from the car and means for positioning the receptacle to be automatically received by the car. These devices are preferably attached to or supported by one of the posts 31 which is utilized in supporting the track. The device for removing the receptacle from the car comprises a bracket arm 32 which is suitably secured to the post and embodies a downwardly curved picker 33, this picker being in operative relation to an inclined wire 34 which serves to conduct the receptacle to the house of the patron or subscriber and the picker is fixed to a shaft 35, the latter being journaled in one end of the horizontal portion 36 of the bracket arm. A spring 37 which is preferably of the coil type and encircles the shaft 35 serves to return the picker to normal inoperative position and to hold it in such position until depressed by an approaching car. Depressing of the picker may be accomplished in different ways under the control of the car. In the present instance this is accomplished by a rod 38 which is mounted to slide longitudinally of the horizontal portion 36 of the bracket arm and has a laterally bent cam portion 39 which bears against the rear side of the picker so that when the rod 38 is reciprocated in one direction it will depress the picker and hold it in such position and when reciprocated in an opposite direction will permit the picker to rise and return to normal inoperative position. Displacement of the rod 38 is prevented by a bend 40 thereof which operates in a vertical longitudinal slot 41 formed in the horizontal portion 36 of the bracket arm. The rod 38 is operatively connected to a lever 42, the latter being fixed to a shaft 43 journaled in the lower portion of the bracket arm 32, and the outer end of the shaft 43 has a curved arm 44 fixed thereto by a set-screw 45 whereby the angle of this arm may be adjusted. The free end of the arm 44 carries a roller 46 which is adapted to be operated upon by one of the cam rails 30 on the under side of the car, the opposite end of each of these cam rails being inclined as shown in Fig. 1 and, hence, as the car approaches the station, the inclined portion of the cam rail will operate upon the roller 46, causing the arm 44 to be depressed with the result that the picker 33 is lowered and set in line with the hook 15 of the lowermost receptacle on the corresponding side of the car, and the movement of the car will cause the picker to enter the forward open side of the hook and as the car continues to move forward the receptacle to which this hook is attached will be withdrawn from the rear of the car. The receptacle will be suspended on the wire 34 by the hook and may travel by gravity to a suitable delivery point. The operating mechanism on the picker may be normally held in inoperative position by a tension spring 47.

The means for positioning a receptacle to be taken up or received by the car is preferably of such a construction that the receptacle may be placed upon the positioning means while the latter is lowered or within reach of the ground and after being so adjusted may be elevated to the track. Such a construction is shown in the present instance, it comprising a frame composed of side members or tracks 48 and appropriate braces 49, this elevator frame being secured by a bracket 50 or other suitable means to one side of the adjacent post 31. The side members 48 of the elevator frame serve as tracks for a carrier and these side members are preferably composed of channel irons as shown in Fig. 6. The carrier which serves to elevate and position the receptacles comprises a cross member 51 having a frame 52 secured thereto, this frame carrying a set of four rollers 53 which operate in pairs in the respective channel-shaped track members 48, and the cross member 51 also carries a pair of members which serve to hold the receptacle in position to be taken up by the car, such members, however, being automatically retracted to clear the path of the car. Each of these members comprises a rod 54 which is slidable transversely of the member 51 and operates telescopically in a sleeve 55 which is secured to the rear of the member 51. The forward end of the rod 54 has fingers 56 to suitably engage the receptacle. Preferably, one of these fingers (the finger 56ª in the present instance) is pivoted and provided with a pressure spring 57 whereby a yieldable and frictional hold may be exerted upon the receptacle. The receptacle-holding member which engages the rear portion of the receptacle is also preferably provided with an auxiliary finger 58 to prevent longitudinal displacement of the receptacle incident to the engagement of the forward end of the receptacle with the car. A spring 59 operates upon each receptacle-holding member with a tendency to retract such member out of the path of the car. A coil spring is shown in the present instance which surrounds the sleeve 55 and bears at one end against the rear side of the member 51 and engages at its opposite end a flanged collar 60, the latter being slidable longitudinally on the exterior of the sleeve 55 and is connected by a transverse pin 61 to the inner rod 54, the rear portion of the sleeve 55 being slotted at 62 to accommodate the pin 61. Each receptacle-positioning member, however, is provided with means for retaining it in the path of the car so as to properly deliver a receptacle thereto, the rod 54 for each member being provided for this purpose with a notch 63 adapted to receive a detent 64, the latter being pivoted at 65 to the member 51 and is provided with a forwardly projecting tripping rod 65, the detents being automatically tripped by the car in order that the receptacle-positioning members will clear the path of movement thereof.

The carrier is held in proper elevated position by a catch 66 which, however, is under the control of the car. In the present instance, this catch 66 is adapted to coöperate with a rearwardly projecting plate 67 secured to a suitable part of the carrier, the catch 66 being automatically deflected as the carrier is raised and engaging beneath the plate 67 to hold the carrier in elevated position. The catch is secured to the transverse shaft 68 mounted in a pair of supporting brackets 69 and 70, these brackets 69 and 70 being formed so as to embrace the respective side members 48 of the elevator frame and are provided with set-screws 71 and 72 whereby the catch may be secured at different elevations on the elevator frame corresponding to the position to be occupied by the carrier. The height of the carrier will depend also upon whether receptacles from the respective station are to be introduced into the upper or lower receiving compartment of the car. A spring 73 encircles the shaft 68 and operates to retain the catch in engagement with the plate 67. This catch 67, however, is automatically tripped or released by the car after the latter has taken up a receptacle. For this purpose, a tripping arm 74 is fixed to the shaft 68 and when the catch is in fastened position the tripping arm 74 will be in approximate alinement with the tripping arms 65 for the receptacle-holding members. The receptacle is placed between the figures of the members as shown diagrammatically in Fig. 1 and both of the receptacle-positioning means are adjusted so that they project toward the track and position the receptacle in the path of one of the receiving compartments on the car, these members being held in such position by the detents 64. A trip 75 having an inclined or cam-shaped lower edge is secured to the side of the car to correspond to each receiving compartment therein. As the car approaches the station, the forward end of the receptacle will enter the receiving compartment and immediately thereafter the trip on the car will engage the tripping arm 65 of the forward detent and will operate the latter to release the respective receptacle-positioning member, allowing the latter to immediately return to normal inoperative position so as to clear the path of movement of the car. As the car proceeds, the receptacle will further enter the receiving compartment and the trip on the car will engage the tripping arm on the second detent, causing the latter to trip the second receptacle-positioning member and allow it to retract. Finally, the trip 75 on the car will engage and depress the tripping arm 74 on the shaft 68, thereby disengaging the catch 66 from the plate 67 and allowing the carrier to descend. Any suitable means may be provided for elevating the carrier, a cord 76 being shown in the present instance which may extend to the ground and passes over a pulley 77 at the top of the elevator frame, one end of the cord being secured to the plate 67 or to any other appropriate part of the carrier.

To insure proper relation between the car and the devices at the station for removing one receptacle from the car and for delivering another receptacle thereto, a pair of brackets 78 and 79 are preferably used, these brackets being rigidly secured to the post and having rails 81 and 82 which are grooved to receive and lie beneath the track wires 20 and 21, these rails being straight and hence causing the car to occupy a level position while passing the station. The brackets also have braces 83 to maintain the track in proper angular relation.

To enable the car to follow a loop or branch in the system, an automatic switch has been provided which comprises a bracket 84 adapted to be secured to one of the supporting posts and having a switch blade 85 pivoted thereto at 86, this switch blade being arranged opposite to a portion of the track 87 which is supported by an opposed bracket 88, and the movement of the switch is limited by a pin 89 operating in a slot 90 in the switch blade. A spring 91 normally operates upon the switch blade to move it toward the track 87.

I claim as my invention:—

1. In apparatus of the character described, the combination of a suitable track, a car adapted to travel thereon and having a compartment to contain a receptacle for delivery therefrom, and a pick-up device for automatically receiving the receptacle delivered from the car, said device having means controlled by the car for automatically setting it in operative position.

2. In apparatus of the character described, the combination of a suitable track, a car adapted to travel thereon and having a compartment to contain a receptacle for delivery therefrom, and a pick-up device for automatically receiving the receptacle delivered from the car, said device having means controlled by the car for automatically setting it in operative position during the passage of the car and for returning it to inoperative position after delivery of such receptacle.

3. In apparatus of the character described, the combination of a track, a car adapted to travel thereon and having a compartment to contain a receptacle for delivery therefrom, a stationary receiving wire for the receptacle, a picker coöperative with said wire, and means controlled by the car for setting the picker in position to receive the receptacle delivered from the car and to transfer it to said wire.

4. In an apparatus of the character described, the combination of a track, a car adapted to travel thereon and having a compartment to contain a receptacle for delivery, a picker mounted on a stationary support, means for moving the picker to and holding it in an inoperative position, and means for setting the picker in operative position to receive the receptacle delivered from the car embodying an arm operatively connected to the picker and a cam rail on the car coöperative with said arm.

5. In an apparatus of the character described, the combination of a track, a car adapted to travel thereon and having a compartment to contain a receptacle for delivery, a picker, a spring normally holding the picker in inoperative position, a reciprocatory rod having a cam portion coöperative with the picker, an arm operatively connected to said rod, and means on the car coöperative with said arm for moving the picker into position to remove the receptacle from the car.

6. In an apparatus of the character described, the combination of a track, a car adapted to travel thereon and having a receptacle delivering compartment, a receptacle adapted to be contained in said compartment and having a projection, a picker adapted to coöperate with said projection to remove the receptacle from the car, and means controlled by the movement of the car for setting the picker in operative position.

7. In an apparatus of the character described, the combination of a track, a car adapted to travel thereon and having a receptacle-receiving compartment, a device for positioning a receptacle in front of and in the path of movement of the car to be received by said compartment, and means controlled by the movement of the car for withdrawing said device from such position.

8. In an apparatus of the character described, the combination of a track, a car adapted to travel thereon and having a receptacle-receiving compartment, a movable device for positioning a receptacle in the path of movement of the car and to be received by said compartment, means for holding said device in such position, and means operative by the car for releasing said device and permitting it to move out of the path of movement of the car before the passage thereof.

9. In an apparatus of the character described, the combination of a track, a car adapted to travel thereon and having a receptacle-receiving compartment, an elevator frame leading to one side of the track, a carrier movable vertically on the elevator frame and embodying means for holding a receptacle in position to be received by said compartment, and a catch releasable by the car for retaining the carrier in elevated position on said frame.

10. In an apparatus of the character described, the combination of a track, a car adapted to travel thereon and having a receptacle-receiving compartment, an elevator frame leading to one side of the track, a carrier movable vertically on the elevator frame and embodying means for holding a receptacle in position to be received by said compartment, and a catch operative automatically as the carrier moves into operative position to lock the carrier in such position.

11. In an apparatus of the character described, the combination of a track, a car adapted to travel thereon and having a receptacle-receiving compartment, and a device for positioning a receptacle in the path of movement of the car and to be received by said compartment comprising a receptacle-holding member adapted to move to and from the path of movement of the car, and means controlled by the car for retracting said member from the path of movement of the car.

12. In an apparatus of the character described, the combination of a track, a car adapted to travel thereon and having a receptacle-receiving compartment, and a device for positioning a receptacle to be received by said compartment comprising a receptacle-holding member slidable to and from the path of movement of the car and having a fork to engage and hold the receptacle in position to be received by said compartment, a retracting spring for said member, a detent for holding said member in operative position in opposition to said spring, and means on the car for releasing said detent.

13. In an apparatus of the character described, the combination of a track, a car adapted to travel thereon and having a receptacle-receiving compartment, and a device for positioning a receptacle to be received by said compartment comprising a receptacle-holding member provided with fingers one of which is spring-operated to produce a frictional hold upon the receptacle.

14. In an apparatus of the character described, the combination of a track, a car adapted to travel thereon and having a receptacle-receiving compartment, and means for positioning a receptacle relatively to said compartment comprising a plurality of receptacle-holding members movable transversely of the path of movement of the car, detents for holding said members in operative position, and means carried by the car for successively releasing said detents.

15. In an apparatus of the character described, the combination of a track, a car adapted to travel thereon and having a receptacle-receiving compartment, and means for positioning a receptacle relatively to said compartment comprising an elevator frame, a carrier movable vertically thereon and provided with a movable receptacle-holding member, a catch for holding the carrier in operative position and having a trip arm, a detent for holding the receptacle-holding member in operative position, and means on the car for tripping said detent and trip arm.

In testimony whereof I have hereunto set my hand in presence of the subscribing witnesses.

RUFUS G. STARKWEATHER.

Witnesses:
ARLEIGH D. RICHARDSON,
A. W. McGOWAN,
A. D. RICHARDSON, Jr.

Copies of this patent may be obtained for five cents each, by addressing the "Commissioner of Patents, Washington, D. C."